Patented Dec. 22, 1925.

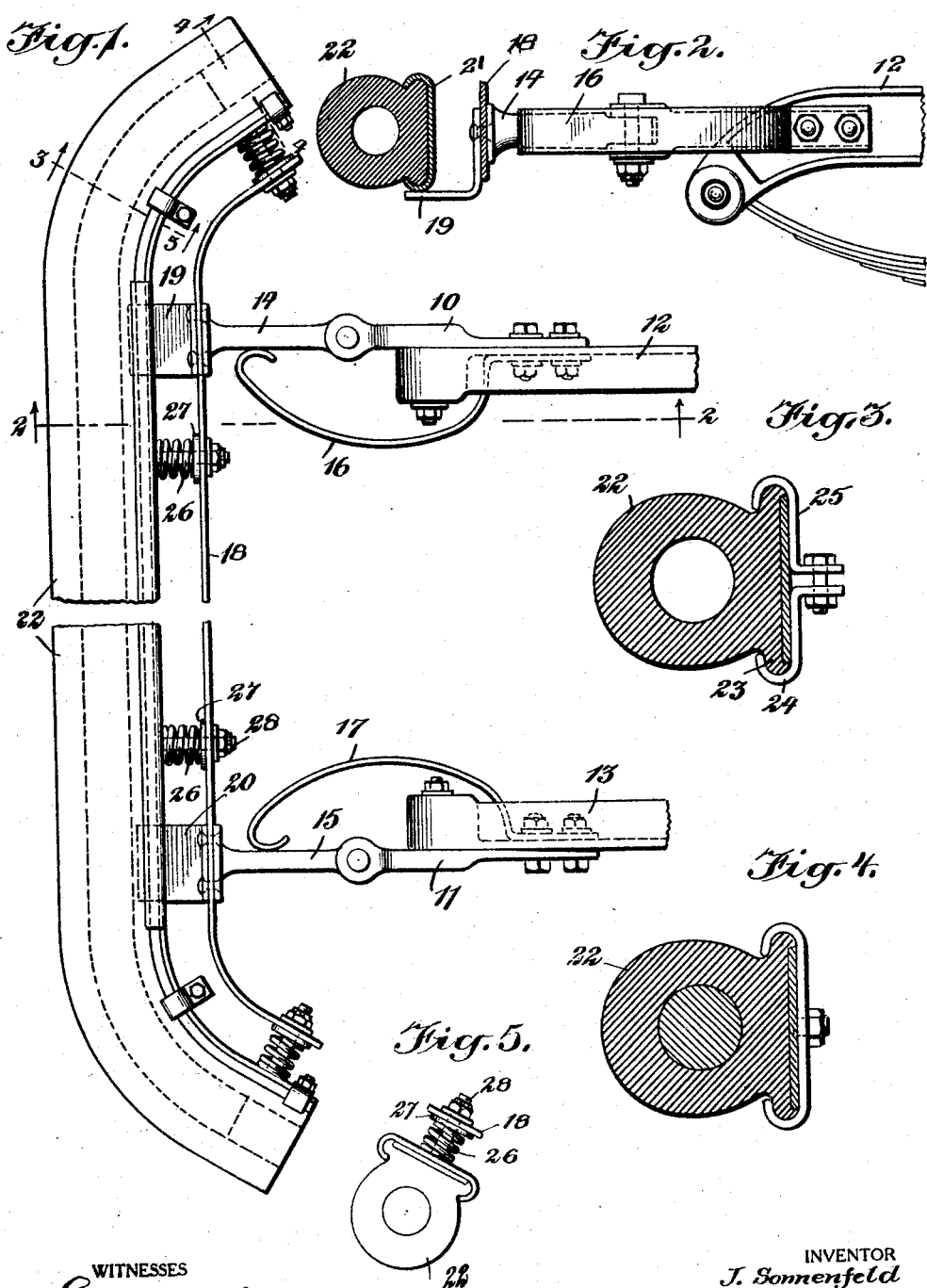

1,566,991

UNITED STATES PATENT OFFICE.

JOSEPH SONNENFELD, OF BROOKLYN, NEW YORK.

AUTOMOBILE BUMPER.

Application filed August 5, 1925. Serial No. 48,292.

*To all whom it may concern:*

Be it known that I, JOSEPH SONNENFELD, a citizen of the United States, and a resident of the city of New York, borough of Brooklyn, and county of Kings, and State of New York, have invented a new and Improved Automobile Bumper, of which the following is a full, clear, and exact description.

The invention relates to automobile bumpers and an object of the invention is to provide a bumper which is unusually resilient so that movement thereof in desired directions is readily permitted while at the same time the construction affords a bumper which is otherwise strong and little likely to be impaired by sharp contact.

A further object is to provide a bumper in which the possibility of sagging is eliminated.

The invention is illustrated in the drawing of which Figure 1 is a plan view of the front end of a chassis with the bumper attached; Figure 2 is a section taken on a line 2—2 of Figure 1; Figure 3 is a section taken on a line 3—3 of Figure 1; Figure 4 is a section taken on the line 4—4 of Figure 1; Figure 5 is an elevation of one end of the bumper.

In its general aspects the invention comprises a bumper formed of two guard-plates, one a front guard-plate which is cushioned by any suitable means, such as a hollow rubber covering. This front guard-plate is preferably more rigid than the other guard-plate which I call the rear guard-plate. This rear guard plate is of substantially the same dimensions as the front guard-plate but is made of lighter and more resilient metal.

The rear guard-plate is preferably connected to a plurality of arms which are pivotally connected to the chassis of the automobile. The connection between the two guard-plates is effected by means of a plurality of interposed bolts and springs whereby the front guard-plate can move with respect to the rear one. The rear guard plate is also provided with forwardly projecting platforms which extend beneath the front guard-plate at suitable points to prevent it from sagging while permitting its rearward movement.

The pivotal arms which are used to connect the bumper plates to the chassis are engaged by resilient members which tend to resist their lateral movement, so that when the bumper plates are released from pressure or contact they should move back to normal position by these resilient members.

In the preferred form of the invention shown in the drawing I provide a pair of bracket members 10 and 11 attachable preferably to the chassis bars 12 and 13; to these bracket members pivotal arms 14 and 15 are connected. These arms are adapted pivotally to move laterally in either direction from the normal position shown in Figure 1. These arms are respectively engaged by spring members 16 and 17 suitably connected to the chassis. These spring members tend to oppose the movement of the respective arms 14 and 15 in certain directions. These arms at their forward ends are connected to a rear guard-plate 18 which is of thin flexible steel preferably, and is of a length to extend the required distance across and in front of the car. The bars are also provided with forwardly projecting platform plates such as 19 and 20. These plates are adapted to act as supports for the front bumper plate 21, which, as shown in Figures 1 and 2, is in the form of a channel bar of a curvature similar to the rear guard-plate 18. The front of this guard-plate 21 is provided with a cushioned cover in the form of a length of rubber or resilient material 22 preferably hollow. This length of material is a resilient core or element having flanges such as 23 adapted to lie within the flanges 24 of brackets 25. The cover or shoe, as I shall call it, 22, is held in position at intervals throughout its length by means of clamping brackets 25.

In order to permit the front guard-plate to move back with respect to the rear guard-plate, I provide a plurality of springs, such as coiled springs 26. These bear against the rear of the front guard-plate at one end and preferably lie in dished washers such as 27 at their other ends. These springs 26 surround bolts 28 which pass through suitable apertures in the rear guard-plate and are connected to the front guard-plate. These bolts act to guide the front guard-plate in its movement rearwardly.

By reason of the rubber shoe disposed over the front on the guard-plate 21, the blows or contacts made with this plate are softened; by reason of the movement permitted the front guard-plate rearwardly, the force of the contact is reduced; by reason of the greater flexibility of the rear guard-plate, the pressure and force of the contact is minimized. A further reduction in the destructive effect of contact with this bumper is effected by means of the pivotal mounting of the bumper on the chassis. The deflection downwardly of the bumper is prevented by means of the supports 19 and 20. The immediate return of the bumper to normal position after contact, is effected by means of the springs 16 and 17.

By reason of this construction the bumper will not sag; it will not become loose and rattle because it is effectively supported; it has additional flexibility by reason of the cushioned shoe 22, the springs 26, the flexible rear plate 18, the pivotal arms 14 and 15 and the springs 16 and 17.

What I claim is:—

1. An automobile bumper which comprises a front guard-plate, cushioning means on said front guard-plate, a more flexible rear guard-plate and resilient means disposed between said plates permitting movement of the one with respect to the other.

2. An automobile bumper which comprises a front guard-plate, cushioning means on said front guard-plate, a more flexible rear guard-plate and resilient means disposed between said plates permitting movement of the one with respect to the other, means for supporting the front guard-plate, to prevent it sagging and means for pivotally mounting the rear guard-plate on the chassis.

3. An automobile bumper which comprises a front guard-plate, cushioning means on said front guard-plate, a more flexible rear guard-plate and resilient means disposed between said plates permitting movement of the one with respect to the other, means for supporting the front guard-plate to prevent it sagging and means for pivotally mounting the rear guard-plate on the chassis, and spring means for resisting movement of the bumper from its normal position.

4. An automobile bumper which comprises a pair of arms pivotally connected to the chassis of an automobile, spring members engaging said arms intending to hold them in a normal position, a flexible rear guard-plate connected to said arms, a more rigid front guard-plate disposed in front of the rear guard-plate, a resilient cushion on said front guard-plate, and spring means disposed between said guard-plates.

5. An automobile bumper which comprises a pair of arms pivotally connected to the chassis of an automobile, spring members engaging said arms intending to hold them in a normal position, a flexible rear guard-plate connected to said arms, a more rigid front guard-plate disposed in front of the rear guard-plate, a resilient cushion on said front guard-plate, and spring means disposed between said guard-plates, and means connected to the arms and extending forwardly beneath the front guard-plate to support the same and prevent it from sagging.

JOSEPH SONNENFELD.